Sept. 28, 1965  F. X. KISH  3,209,068
APPLIANCE UNIT AND COMBINATION PLUG AND TOOL THEREFOR
Filed Aug. 12, 1963
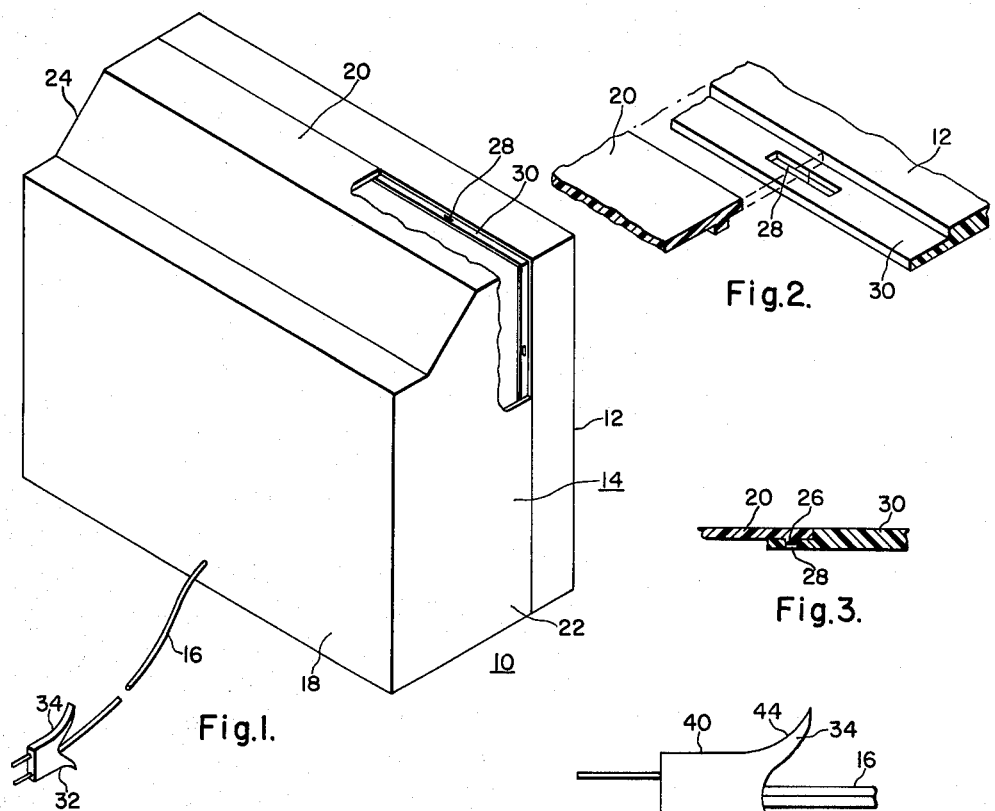
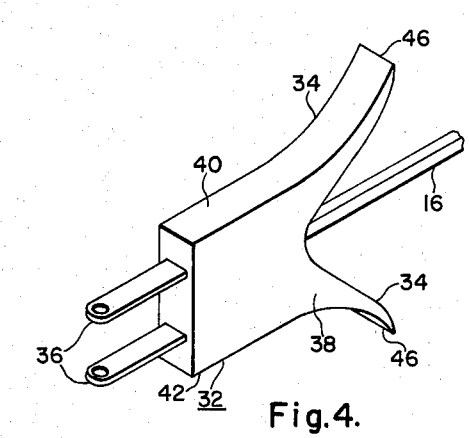
Fig.4.
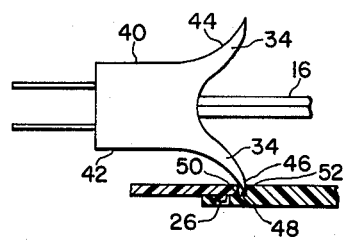
Fig.5.
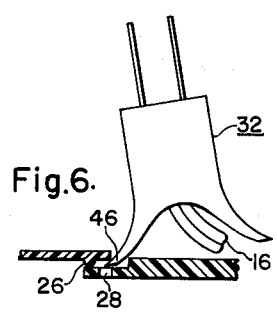
Fig.6.
WITNESSES
Theodore F. Wrobel
Edward F. Possessky
INVENTOR
Francis X. Kish
BY F. V. Lyle
ATTORNEY

United States Patent Office 3,209,068
Patented Sept. 28, 1965

3,209,068
APPLIANCE UNIT AND COMBINATION PLUG
AND TOOL THEREFOR
Francis X. Kish, Metuchen, N.J., assignor to Westinghouse Electric Corporation, East Pittsburgh, Pa., a corporation of Pennsylvania
Filed Aug. 12, 1963, Ser. No. 301,501
3 Claims. (Cl. 174—135)

The present invention relates to electrical plugs structurally adapted for use as tools, and more particularly to such plug and tool combinations which especially have utility when provided on the power cord of an appliance.

In appliances such as radio or television sets, electrical operating elements are enclosed within a cabinet or the like and access thereto is provided by means of a cover or panel or similar enclosing member. Servicing the set circuitry normally requires removal of the cover and the tool or tools required for cover removal depend upon the manner in which the cover is secured in place.

If the appliance or set plug is arranged structurally so as both to provide power transmittal to the set when connected to an outlet and to provide tool action for cover removal when disconnected, the safety of plug removal from a wall or similar outlet is substantially assured during the servicing operation while the servicing need for an extra tool for cover removal is eliminated. Further, in portable appliances or portable radios or the like, tools for cover removal (to replace batteries for example) are very often not accessible depending on the location of use and therefore a combination plug-tool is particularly useful in this case.

Thus, in accordance with the principles of the present invention, there is provided a radio or television or similar appliance which includes a cord having a plug arranged structurally for energizing the appliance when attached to an outlet and further for removing a cover or panel of the appliance when it is removed from the outlet. In particular, the appliance is provided with resilient latching means for securing the cover in place and the plug is provided with one or more prying members for detaching the cover from its latched securance. The prying members can be so formed as also to facilitate manual gripping of the plug when it is attached to or removed from an outlet.

It is therefore an object of the invention to provide a novel appliance or radio or television set having a power plug which serves as a tool for removing a cover of the appliance or set.

Another object of the invention is to provide a novel appliance or radio or television set having a power plug which serves as a tool for removing a cover of the appliance or set and which further assures set or appliance deenergization when it is so used for servicing purposes.

These and other objects of the invention will become more apparent upon consideration of the following detailed description along with the attached drawing, in which:

FIGURE 1 is a perspective view of an appliance or portable radio set constructed in accordance with the principles of the invention;

FIG. 2 is an enlarged perspective view showing separated portions of the radio of FIG. 1 and the manner in which they are interengaged in latched relation;

FIG. 3 shows a cross sectional view of the portions shown in FIG. 2 when they are in latched relation;

FIG. 4 shows a perspective view of a plug provided as a part of the radio of FIG. 1 and constructed in accordance with the principles of the invention; and FIGS. 5 and 6 show respective views illustrating the manner in which the plug of FIG. 4 is used to detach the latched portions of FIG. 3 from each other.

More specifically, there is shown in FIG. 1 an appliance or portable radio set 10 having a face piece 12 secured to or integral with a base or chassis member (not shown) upon which operating circuit and other elements are disposed. The circuitry and chassis are enclosed by means of a cover 14 which is formed from a resilient flexible material such as polypropylene. A cord 16 is provided for energizing the radio 10 and it can be attached to a suitable outlet or source (not shown) for this purpose. The cord 16 can extend outwardly through an opening in the cover 14 or it can be extended outwardly by other suitable means.

The cover 14 is provided with back and top walls 18 and 20 and side walls 22 and 24 so as to provide a full cabinet or enclosure for the radio 10 when it is secured in place. Such securance is accomplished by means of a plurality of inwardly extending projects 26 disposed about and adjacent the edge periphery of the top and side walls 20, 22 and 24. The projections 26 are further so disposed as to be alignable with mating slots 28 provided in a rearward extending frame 30 on the face piece 12. The frame 30 is arranged for a relatively close fit within the inner edge periphery of the top and side walls 20, 22 and 24 of the cover 14, and, to enhance the closeness of such fit, the walls 20, 22 and 24 can be bowed inwardly to a relatively slight extent. In this case, a pair of projections 26 are provided on each wall 20, 22 or 24 so as to provide general uniformity in securance forces about the periphery of the walls 20, 22 and 24 and the frame 30. However, other quantities of projections 26 can be provided on any or all of the walls 20, 22 and 24, for example only a single projection 26 can be provided on each side wall 22 or 24.

Attachment of the cover 14 to the radio face piece 12 can be accomplished, for example, by first sliding the cover 14 forwardly toward the face piece 12 while guide means thereof (not shown) are mutually engaged. Such guide means can be provided in the form of an integral rib and a complementary channel extending in the front-rear direction respectively at the bottom of each side wall 22 or 24 and at each side of the aforementioned base member or integral base portion of the face piece 12. The cover 14 is moved forwardly as described until the projections 26 approach the respective mating slots 28. As the projections 26 move over the frame 30 (subsequent to slight outward deflection of the cover walls 20, 22 and 24 if necessary) toward the respective slots 28, the projections 26 are urged into the mating slots 28 when such are disposed in mutual alignment because of the natural resiliency and flexibility of the cover material. If the cover walls 20, 22 and 24 are inwardly bowed as previously described, this interengagement action is enhanced.

Removal of the cover 14 from the radio face piece 12 requires prying action on the edges of the walls 20, 22 and 24 adjacent the projections 28, and for this purpose an electrical plug 32 secured to the radio cord 16 is provided with one or more prying members 34. The plug 32 is provided with the usual elongated blades 36 for attaching the plug 32 to a wall or other outlet. A conductive connection is established between the blades 36 and respective wires of the cord 16 by suitable means such as by solder or by a clamping engagement provided by clamping structure (not shown) on the inner end of each blade 36.

An insulative housing 38 is provided for the plug 32 and it can be molded as a single unit about the blades 36 and the cord 16 or it can be provided as separate molded parts secured together by suitable means about the same elements. In this case, a pair of prying members 34 are provided, and each member 34 extends longitudinally of the cord 16 and laterally outwardly therefrom along its length. Accordingly, the members 34 also extend laterally outwardly of respective side walls 40 and 42 of the plug housing 38.

Each prying member 34 can be provided with laterally directed curvature along its length as indicated by the reference character 44. Accordingly, substantial pivot action can be obtained during prying movement of one of the prying members 34 as observed in FIGS. 5 and 6.

Such prying action is obtained by inserting edge 46 of a prying member 34 in a relatively small space 48 between edge 50 of one of the walls 20, 22 or 24 and edge 52 of the radio face piece 12 outwardly of the frame 30. If necessary, pivotal movement of the plug 32 through an angle of nearly 90° can be obtained to detach the adjacent cover projection 26 from its latched relation with the mating slot 28. After the projections 26 on the walls 20, 22 and 24 are unlatched (and after breaking the interlock connection if such is provided between the cord 16 and the radio circuitry adjacent the cover back wall 18), the cover 14 can then readily be removed from the radio 10 by rearward sliding action.

The plug prying members 34 are suitably strengthened to withstand the tool service for which they are intended. Thus, the material of the plug housing 38 can be nylon or polypropylene for this purpose. Since the prying members 34 extend laterally outwardly of the plug side walls 40 and 42, the members 34 therefore also serve as convenient plug gripping elements in manual detachment of the plug 32 from an outlet or the like. Further, with the provision of the plug 32 as a cover removal tool, there is no need for a separate cover removal tool and there is assurance that the radio 10 is deenergized when the cover 14 is being removed with the use of the plug 32. Of course, the plug 32 can be incorporated in appliances other than the radio 10 for cooperative tool action with cover or panel members differing in form from the cover 14. For example, in another embodiment of the invention (not shown), the plug 32 operates as a tool for unlatching a hinged panel enclosing the operating tubes and other circuitry in a phonograph set.

The foregoing description has been set forth only to illustrate the principles of the invention. Accordingly, it is desired that the invention be not limited by the embodiment described, but, rather, that it be accorded an interpretation consistent with the scope and spirit of its broad principles.

What is claimed is:

1. An appliance unit having a flexible resilient cover means secured to another housing portion thereof by means of interlatched projections and openings disposed about a portion of the edge periphery of said cover means and said other housing portion, a combination plug-tool attached to a cord of said appliance unit so as to provide for removal of said cover means from said appliance housing portion, said plug-tool having an insulative elongated housing from which blades are frontally extended for attachment to an outlet, said plug-tool housing having at least one prying member extending longitudinally outwardly and rearwardly away from said blades and being insertable between said cover means and said other housing portion adjacent said projections so as to unlatch the latter from said openings by prying action, said prying member further extending laterally outwardly of said plug-tool housing along the length thereof so as to provide for substantial pivotal prying movement of said prying member.

2. An appliance unit as set forth in claim 1, wherein a prying member is extended longitudinally rearwardly and laterally outwardly from each of opposite lateral sides of said plug-tool housing.

3. An appliance unit as set forth in claim 1, wherein said prying member extends laterally outwardly with a laterally directed curvature along the length thereof.

References Cited by the Examiner
UNITED STATES PATENTS 1,775,564  9/30   Goodspeed _____ 339—110 X
3,008,115  11/61  Oakes _____ 339—110 X JOHN F. BURNS, Primary Examiner.

LARAMIE E. ASKIN, Examiner.